July 10, 1923.
F. A. NAUTS
1,461,223
HUB BEARING CONSTRUCTION
Filed March 6, 1922
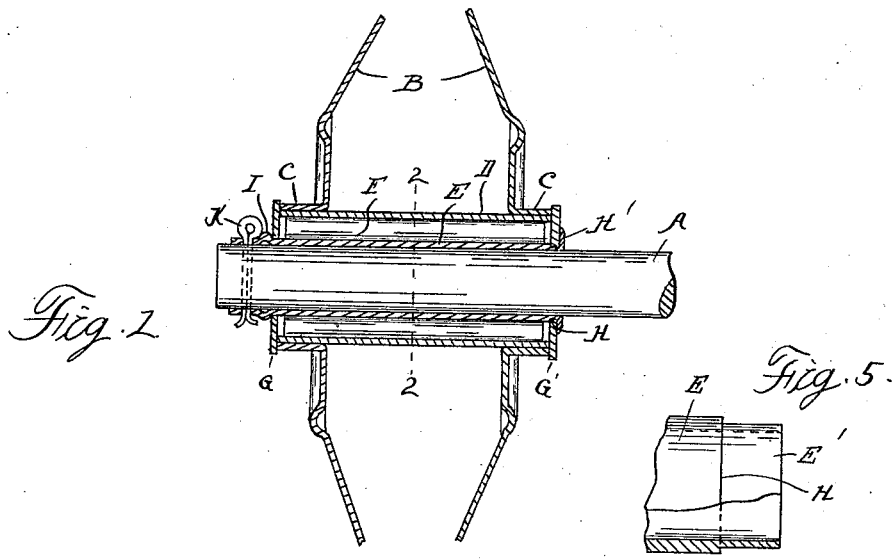
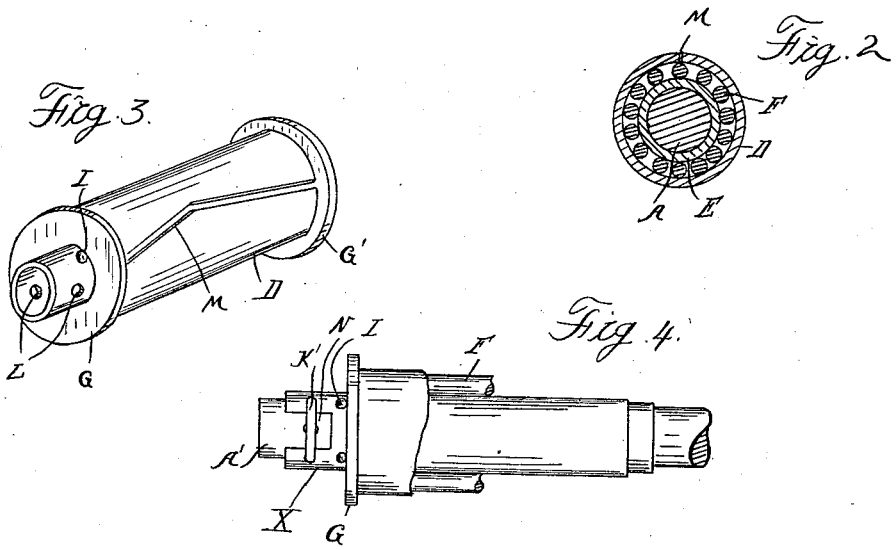
Inventor
Frank A. Nauts
By Whittemore Hulbert Whittemore
+ Belknap
Attorneys Patented July 10, 1923.

1,461,223

UNITED STATES PATENT OFFICE.

FRANK A. NAUTS, OF TOLEDO, OHIO, ASSIGNOR TO THE GENDRON WHEEL COMPANY, OF TOLEDO, OHIO, A CORPORATION OF OHIO.

HUB-BEARING CONSTRUCTION.

Application filed March 6, 1922. Serial No. 541,627.

*To all whom it may concern:*

Be it known that I, FRANK A. NAUTS, a citizen of the United States of America, residing at Toledo, in the county of Lucas and State of Ohio, have invented certain new and useful Improvements in Hub-Bearing Constructions, of which the following is a specification, reference being had therein to the accompanying drawings.

This invention relates to wheel hubs and particularly relates to hubs for the wheels of children's vehicles, such as wagons, automobiles and other vehicles for children's use.

It is the object of the invention to provide a hub wherein rollers or other anti-friction elements are assembled between the barrel of the hub and a skein adapted to be fixed upon a vehicle axle, washers being mounted upon said skein to form end retainers for the rollers.

In the drawings:—

Figure 1 is an axial sectional view of the hub showing a portion of a double disk body carried by the hub;

Figure 2 is a cross section on line 2—2 of Figure 1;

Figure 3 is a perspective view of the hub;

Figure 4 is a plan view of an alternative construction;

Figure 5 is a view in partial section of the inner end portion of the skein showing the proportions thereof, prior to assembly.

In these views the reference character A designates an axle and B the body of a double disk wheel which is mounted upon said axle. The hub of said wheel comprises a barrel D, the disk members being annularly flanged outward, as indicated at C, to embrace the ends of said barrel. E is a skein embracing the axle A and assembled permanently in a unitary relation with the hub of the wheel. Between said skein and the barrel D an anti-friction bearing is formed by a set of rollers F which are restrained from endwise shifting by washers G and G′, secured upon the ends of the skein and preferably formed of hardened steel to secure a maximum resistance to wear. The inner end of the skein E is reduced in diameter to receive the washer G′, a shoulder H thus being formed against which said washer may abut (see Figure 5). To retain said washer in its place, the outer portion of the part E′ is upset, as indicated at H′. The other washer G is held in place by forming the skein with an annular series of knobs I. The skein projects outwardly from the barrel D sufficiently to provide for the formation of said knobs and also to provide for engagement of a cotter pin K or the like in diametrical opposed openings L in said skein. Thus the latter is restrained both against rotation and longitudinal shifting upon the axle A. Preferably the barrel D is rolled from a sheet metal stamping, the adjoining edges being indicated at M.

In the modification shown in Figure 4 the skein X is restrained from rotation and outward shifting upon the axle A′ by a cotter pin K′ which extends transversely of the axle A′ and which is received by a slot N in said skein.

The described hub is advantageous in that it employs for the barrel and the skein of the hub sheet metal stampings which may be cheaply produced and furthermore in that the retainer members for the rollers have the nature of washers which except for the fact that they are hardened are standard and very inexpensive. Furthermore the construction is one that may be assembled rapidly and without necessity for exercising any considerable mechanical skill. The washers G and G′, in addition to retaining the rollers F also exteriorly reinforce the skein E, preventing expansion or deformation thereof.

What I claim as my invention is:—

The combination with an axle, of a skein embracing said axle, a hub having a barrel surrounding said skein, anti-friction members between said skein and said barrel, a washer surrounding said skein at the outer end thereof and abutting against one end of said barrel, knobs upon said skein retaining said washer in position, the inner end of said skein being reduced in diameter to provide a shoulder, a washer surrounding the reduced portion of said skein and abutting against said shoulder as well as the other end of said barrel, the reduced portion of said skein being upset to retain the last-mentioned washer in abutment with said shoulder, and means for restraining said skein against rotation and longitudinal movement upon said axle.

In testimony whereof I affix my signature.

FRANK A. NAUTS.